US007904592B2

(12) United States Patent
Norton et al.

(10) Patent No.: US 7,904,592 B2
(45) Date of Patent: Mar. 8, 2011

(54) # DISTRIBUTED, FAULT-TOLERANT MESSAGE STORE

(75) Inventors: Joseph Wayne Norton, Tokyo (JP); Gary Hayato Ogasawara, Foster City, CA (US); Jonan Schwartz, Berkeley, CA (US); David Stone, Union City, CA (US); Michael Man-Hak Tso, Saratoga, CA (US)

(73) Assignee: Gemini Mobile Technologies, Inc., Saratoga, CA (US)

( * ) Notice: Subject to any disclaimer, the term of this patent is extended or adjusted under 35 U.S.C. 154(b) by 2492 days.

(21) Appl. No.: 10/686,741

(22) Filed: Oct. 17, 2003

(65) Prior Publication Data

US 2004/0139148 A1 Jul. 15, 2004

Related U.S. Application Data

(60) Provisional application No. 60/418,728, filed on Oct. 17, 2002.

(51) Int. Cl.
*G06F 15/16* (2006.01)

(52) U.S. Cl. ......... 709/245; 709/206; 709/217; 370/312; 455/412.1

(58) Field of Classification Search ................... 709/218
See application file for complete search history.

(56) References Cited

U.S. PATENT DOCUMENTS

| | | | | |
|---|---|---|---|---|
| 5,892,909 | A * | 4/1999 | Grasso et al. | 709/201 |
| 5,916,307 | A * | 6/1999 | Piskiel et al. | 719/314 |
| 6,138,158 | A * | 10/2000 | Boyle et al. | 709/206 |
| 6,173,313 | B1 * | 1/2001 | Klots et al. | 709/203 |
| 6,188,887 | B1 * | 2/2001 | Joong et al. | 455/417 |
| 6,314,108 | B1 * | 11/2001 | Ramasubramani et al. | 370/465 |
| 6,321,257 | B1 * | 11/2001 | Kotola et al. | 709/206 |
| 6,421,707 | B1 * | 7/2002 | Miller et al. | 709/206 |
| 6,424,828 | B1 * | 7/2002 | Collins et al. | 709/206 |
| 6,678,361 | B2 * | 1/2004 | Rooke et al. | 379/93.24 |
| 6,731,926 | B1 * | 5/2004 | Link et al. | 455/412.2 |
| 7,206,836 | B2 * | 4/2007 | Dinker et al. | 709/224 |

OTHER PUBLICATIONS

Clarke, Ian. A Distributed Decentralised Information Storage and Retrieval System. 1999. University of Edinburgh. <http://gnunet.org/papers/freenet.pdf>.*

M. Castro, P. Druschel, Y. C. Hu, and A. Rowstron. Exploiting network proximity in distributed hash tables. In Proceedings of the International Workshop on Future Directions in Distributed Computing (FuDiCo) 2002. <http://research.microsoft.com/~antr/PAST/location.pdf>.*

Rao, Chung-Hwa et al. "iMobile: A Proxy-Based Platform for Mobile Services." Proceedings of the first workshop on Wireless mobile internet. ACM Press. Jul. 3-10, 2001.* Barber, Declan. "GlobalCom: A Unified Messaging System using Synchronous and Asynchronous Forms." Principles and Practice of Programming in Java 2002. Jun. 2002. National University of Ireland. 141-144.*

"Technical Realization of the Short Message Service (SMS) Point-to-Point (PP)," European Telecommunications Standards Institute, ETSI TS 100.901 v7.5.0, Dec. 2001, pp. 1-119.

"WAP MMS Architecture Overview, Version Apr. 25, 2001"; WAP-205-MMSArchOverview-20010425-a, pp. 1-23.

"WAP MMS Client Transactions, Version Jan. 15, 2002"; WAP-206-MMSCTR-20020115- a, pp. 1-33.

"WAP MMS Encapsulation Protocol, Version Jan. 5, 2002"; WAP-209-MMSEndapsulation-20020105-a, pp. 1-39.

* cited by examiner

*Primary Examiner* — Hassan Phillips
*Assistant Examiner* — Jeffrey R Swearingen
(74) *Attorney, Agent, or Firm* — Crowell & Moring LLP

(57) ABSTRACT

A system and method of managing a network provides for distributed storage and retrieval. In one embodiment, information such as a text message is stored by calculating an actual destination node based on a subscriber identifier and a current addressing function, which corresponds to a current topology of a network. The message is sent to the actual destination node for storage. Messages can be retrieved by calculating a plurality of destination nodes based on a subscriber identifier and a plurality of addressing functions, where each addressing corresponds to a topology of the network at a particular moment in time. In one embodiment, the addressing functions are hash functions.

17 Claims, 3 Drawing Sheets

DISTRIBUTED, FAULT-TOLERANT MESSAGE STORE

CROSS-REFERENCE TO RELATED APPLICATIONS

The present application claims priority to U.S. Provisional Application Ser. No. 60/418,728 filed on Oct. 17, 2002, incorporated herein by reference in its entirety.

BACKGROUND

1. Technical Field

The embodiments of the present invention generally relate to the storage and retrieval of messages destined for mobile devices. More particularly, the embodiments relate to systems and methods of managing messages that provide improved scalability and fault-tolerance.

2. Discussion

In the highly competitive wireless networking industry, there is a well-documented trend toward enhanced functionality. While the above trend is desirable to the consumer, it presents significant challenges to network designers as well as service providers. One area of particular concern is the increasing demand for messaging services.

Providing messaging services such as the short message service (SMS) described in "Technical Realization of the Short Message Service (SMS) Point-to-Point (PP)," European Telecommunications Standards Institute, ETSI TS 100.901 v7.5.0, December 2001, to mobile devices such as mobile telephones, personal digital assistants (PDAs) and pagers enables subscribers to communicate in environments in which traditional voice and other nodes of communication are impractical, inconvenient, and often unavailable. Messaging services such as the multimedia messaging service (MMS) described in "WAP MMS Architecture Overview", Version 25 Apr. 2001, WAP-205-MMSArchOverview-20010425-a, WAP Forum, (a copy of which can be obtained from a website maintained by the WAP Forum); "WAP MMS Client Transactions", Version 15 Jan. 2002, WAP-206-MMSCTR-20020115-a, WAP Forum, (a copy of which can be obtained from a website maintained by the WAP Forum); and "WAP MMS Encapsulation Protocol", WAP-209-MMSEncapsulation-20020105-a, WAP Forum, (a copy of which can be obtained from a website maintained by the WAP Forum), are presented with similar challenges in the mobile environment.

As the demand for messaging services increases, the burden on servers to require large storage capacity for messages as well as high-performance message storage and retrieval also increases. Single servers have been proposed, but are typically unable to scale to increased capacity and performance requirements. Furthermore, frequent backup operations are often required in order to maintain data in the event of a server failure. Alternative approaches involve the use of multiple, distributed servers, but they require human intervention in order to reconfigure the wireless network in the event of a server failure. Conventional distributed server techniques are therefore typically unable to handle individual server failures reliably. There is therefore a need to provide an approach that is scalable as well as fault-tolerant.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Systems and methods of managing a network provide for the use of addressing functions to store information to and retrieve information from the network. Each addressing function corresponds to a topology of the network, and as nodes are added to and removed from the network new addressing functions are established. If a message is received at a node for storage, an actual destination node is calculated based on a subscriber identifier contained in the message and the current addressing function. The message is sent to the actual destination node for storage. If a message retrieval request is received at a node, a plurality of destination nodes is calculated based on a subscriber identifier contained in the request and all valid addressing functions. The calculated destination nodes are queried for messages.

Figure 1:
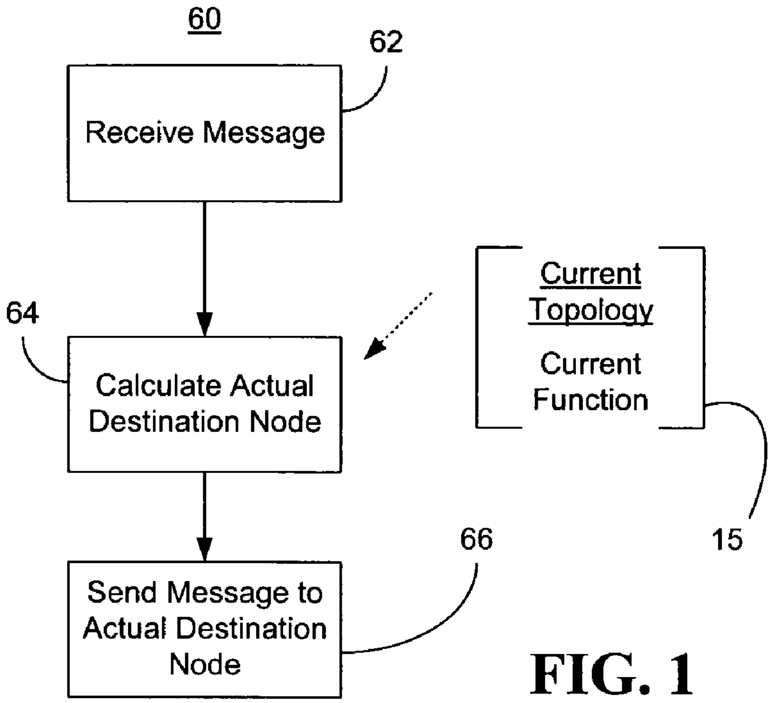
FIG. 1 is a flowchart of an example of a method of storing information according to one embodiment of the invention.

FIG. 1 shows a method 60 of storing information to a network. In the illustrated example, the information to be stored is a message destined for a wireless handset in a wireless network. It should be noted, however, that other types of information can also be stored such as image files, sound files, etc. Illustrated method 60 provides for receiving a message at an initial storage node at processing block 62, where the message includes a subscriber identifier. Block 64 provides for calculating an actual destination node based on the subscriber identifier and a current addressing function 15, which corresponds to a current topology of the network. The message is sent to the actual destination node for storage at block 66. As will be discussed in greater detail, method 60 can also provide for storing the message to an internal queue of the initial storage node and removing the message from the internal queue if a confirmation of receipt is received from the actual destination node. Such an approach increases the fault-tolerance of the network.

Figure 2:
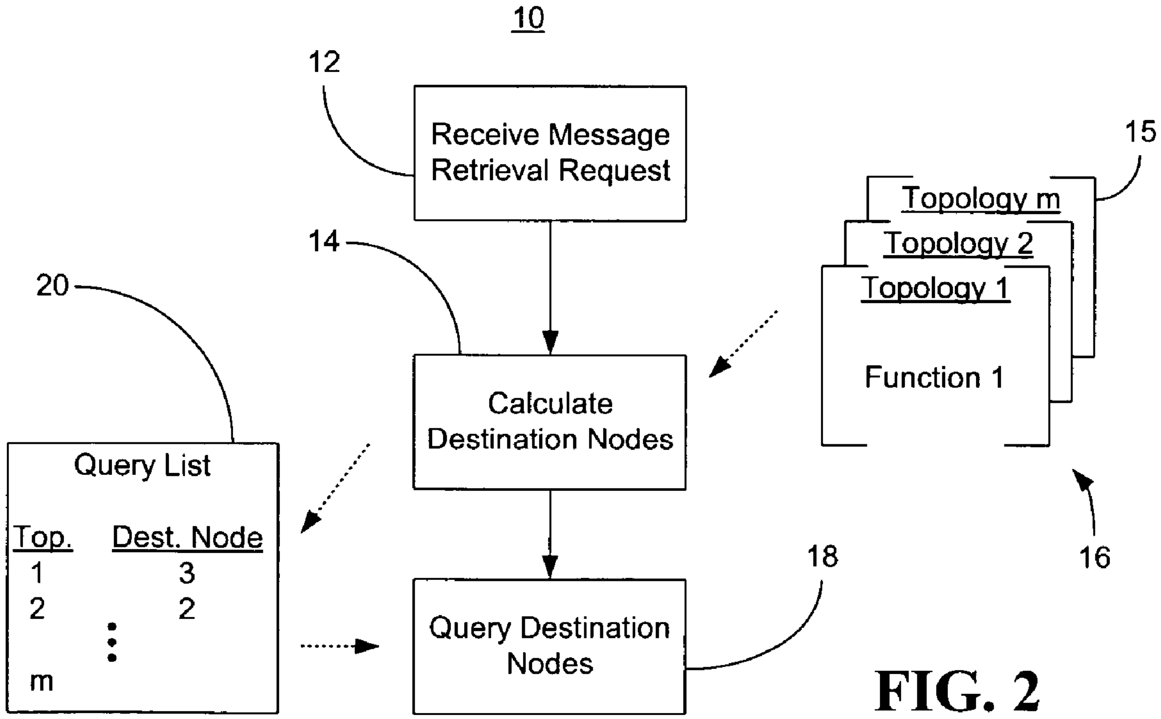
FIG. 2 is a flowchart of an example of a method of retrieving information in accordance with one embodiment of the invention.

FIG. 2 shows a method 10 of retrieving messages in a wireless network. Method 10 can be implemented in any node of the network, where the node functions, at least in part, as a messaging server. While methods 10 and 60 (FIG. 1) will primarily be discussed in reference to text messaging applications, the embodiments are not so limited. Indeed, voice and other messaging systems as well as other information storage systems can benefit from the principles described herein. Notwithstanding, there are a number of aspects of text messaging for which methods 10 and 60 (FIG. 1) are well suited.

Processing block 12 provides for receiving a message retrieval request at a first node of the network. A plurality of destination nodes is identified based on the retrieval request and a plurality of addressing functions 16 at block 14. Each addressing function 16 corresponds to a topology of the network at a particular moment in time. The topology of the network changes whenever a node is added or removed due to communication failure, bandwidth allocation, storage allocation, etc. The result is a query list 20, which contains the appropriate destination nodes for the given retrieval request. Block 18 provides for querying the plurality of destination nodes for messages.

Thus, embodiments of the present invention provide for messaging systems that store messages on a message store that is maintained by a network node. The network node adds, updates, and deletes messages to the store, and retrieves messages from the store to the user device. The network node is also responsible for user authentication to prevent unauthorized access to messages. With messages stored on a networked message store, a user can potentially access his or her messages from multiple locations and multiple user devices. A networked message store, in comparison to a destination user device, also provides high capacity, low cost, and reliable storage.

Thus, a cluster of multiple, distributed nodes is used to store messages when a message to be stored is received by an arbitrary "initial node". Any destination node can be the initial node, which computes an addressing function such as a "destination hash function" to determine the server node to store the message. The hash function may also point to the initial node. If necessary, the initial node forwards the message to the destination node for storage. To protect against communication failure between the initial node and the destination node, the message is queued on the initial node. If the queue becomes full, future messages are rejected. Rejected messages (when the queue is full) are not accepted from the sender and remain on the sender's mail store.

Assuming n nodes numbered from 0 to n−1, a simple hash function H( ) can be to use a numeric unique ID of the user (e.g., Mobile Subscriber Identification Number (MSISDN)) modulo n: H(user)=userID % n.

When the number of nodes changes by the addition or removal of nodes, the destination hash function may no longer work correctly since (a) it will not be able to store messages to an added node, and (b) it will not be able to retrieve messages from a removed node. To address this problem, multiple hash functions may be used. In such an approach, for example, a hash function is considered active if it corresponds to a network topology no older than the message validity period (e.g., 30 days). All active hash functions are maintained. Active hash functions eventually become older than the message validity period and are then deleted. A node may be permanently removed from the cluster only after no active hash functions have the node as a possible value.

When a message retrieval request is received by an arbitrary "initial node", all active hash functions are used to compute the set of destination nodes. Each destination node is queried, and the initial node concatenates the results received. For storing messages, the hash function corresponding to the current network topology is used.

For the purpose of potentially reducing overall messaging traffic between nodes, active hash functions can be expired prior to the message validity period at the expense of some additional bookkeeping overhead. If a node can guarantee that no messages contained in its local storage map to one or more of the active hash functions, the node can mark those hash functions as "locally expired." A node can "lazily" report the status of locally expired hash functions back to a calling node. In other words, the node can limit reporting to instances in which other information is also being sent. A calling node can then avoid subsequent (and unnecessary) messaging traffic by simply ignoring requests that compute to a node in the "locally expired" list of an active hash function.

Although not required by the illustrated method, hash functions can be ordered and accessed in terms of a unique, increasing time stamp that is kept consistent across the entire set of nodes. By choosing this approach, a hash function can be scheduled and delivered to all nodes in the cluster prior to its activation. The access order also follows the natural ordering of messages in a mailbox. The time stamp therefore enables easy indexing and maintenance of the hash functions.

Although the hash functions described up to this point have produced a single result (i.e., destination node address), other types of hash functions may be used. For example, each hash function can alternatively produce multiple destination node addresses. In such a case, safety can be enhanced through redundant data storage. The same message could therefore be stored in multiple nodes. If one of the nodes has a failure, the message can still be retrieved from the other nodes.

Generating multiple destination node addresses also has advantages with regard to message retrieval. For example, retrieval can be implemented by generating a plurality of queries in parallel, where with the message is taken from the first node to respond. Parallel retrieval can also be used to retrieve parts of a message from multiple destination nodes. For example, if a message is stored redundantly on three nodes, one third of the message can be retrieved from each node.

Alternatively, retrieval can be implemented sequentially over a plurality of nodes in a predefined order. For example, a node may be designated as a backup or secondary node that is queried only if the primary node is unavailable.

In addition to above-described storage and retrieval operations, moving subscriber mailboxes can be done in a unique way that uses multiple addressing functions. Moving mailboxes is often done for load-balancing reasons as the system expands and shrinks. The conventional approach to moving mailboxes has been to copy the mailboxes to their new location and to delete the old mailboxes. A shortcoming with this approach is that the mailboxes typically cannot be accessed until the entire move is complete. Since the volume of data being moved is often quite large, the system can have an extended amount of time in which mailboxes cannot be accessed. One approach to dealing with this concern is to redirect new messages associated with each mailbox to a new node and leave old messages associated with the mailboxes at the old node. The approach involves creating new mailboxes on the new node, or, if desired, creating the new mailboxes individually and on demand when new mail arrives for storage. The addressing functions are then updated so that each subscriber identifier calculates to the new node. The old set of addressing functions, however, is maintained.

At the time of retrieval, both sets of addressing functions can be used. Such an approach enables messages to be retrieved from both the old node and the new node. Furthermore, the expiration policy of the addressing functions can be linked to the expiration policy of old messages. For example, if messages expire thirty days after they are stored, then the old addressing function set should be maintained for thirty days as well. Similarly, the deletion policy of old mailboxes can be linked to the expiration policy of old messages. An individual mailbox that contains old messages can be deleted at the end of the thirty day period or sooner if all of the messages in the mailbox have been retrieved and deleted.

To reduce the amount of time for which the old addressing function set is maintained, the old messages can be moved to the new node in reduced segments such as individual mailboxes or smaller sets of mailboxes. Once all of the messages have been moved for the old addressing function set, the old addressing function set can be removed.

It should be noted, however, that if the chosen addressing function matches well with actual messaging traffic, the addition and the deletion of new mailbox nodes automatically re-balances the load across the entire set of new nodes. Explicit mailbox transfer may therefore only be needed in emergency situations if new nodes are added preemptively in response to increased traffic.

In one embodiment, a mobile messaging gateway (MMG) uses a temporary message store (TMS) system to store received short messages and mail digests. A handset retrieves a short message or a digest directly from the MMG with no need to access the message storage system (MSS) or SMS Center (SMSC). This method reduces the load on the MSS and SMSC systems. Other benefits include a simplification of the handset design and potentially faster message retrievals. Handsets can be simpler because they only need to use a single protocol to a single MMG to retrieve different types of messages (SMS, Internet email, picture mail, etc.).

A short message can be defined as a message whose body size is under a system-specified threshold (e.g., 300 bytes). A mail digest can be defined as a listing summary of an individual user's long mail messages. Optionally, the mail digest may also include short messages in the listing summary. A long mail summary is used to build the digest and can contain the From address, Subject, the first part of the text message and a reference to the location of a long mail message stored at a particular MSS node.

The following discussion, directed to one approach to an MMG TMS system, is merely exemplary in nature and is in no way intended to limit the embodiments of the invention or their application or uses.

Guidelines

Figure 3:
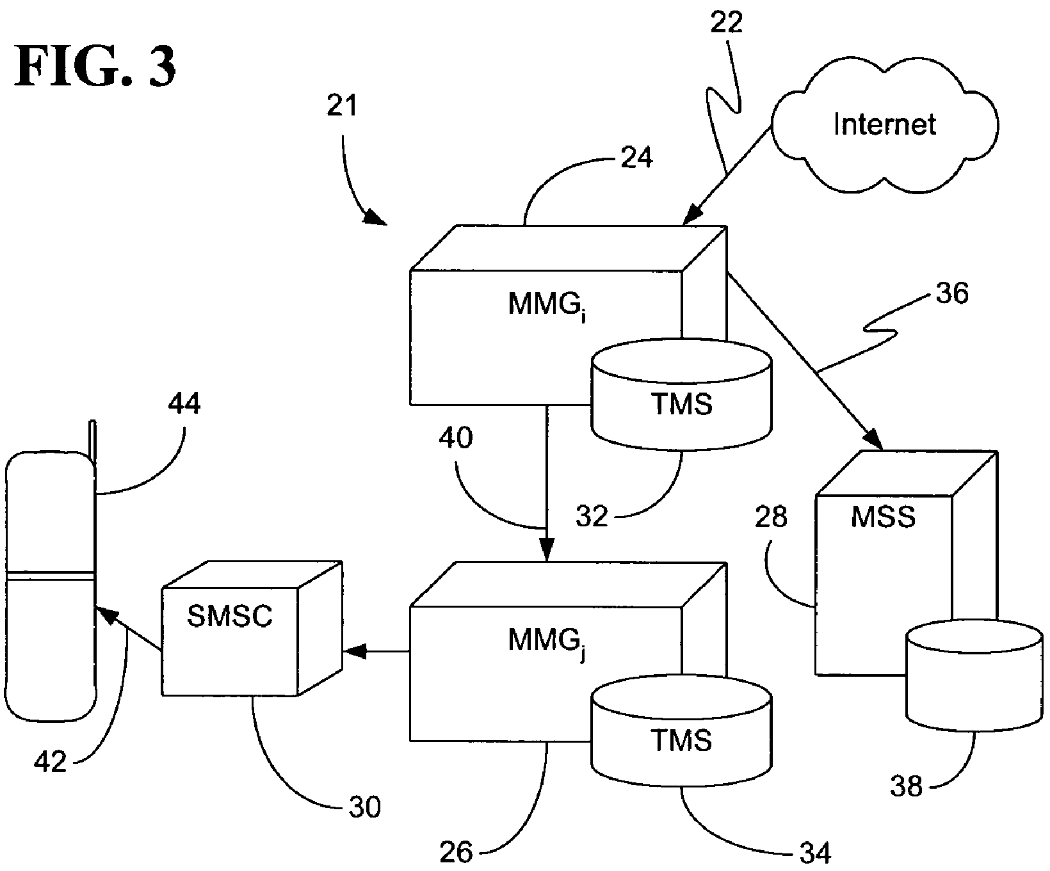
FIG. 3 is a block diagram of an example of a message arrival process in accordance with one embodiment of the invention.
Figure 4:
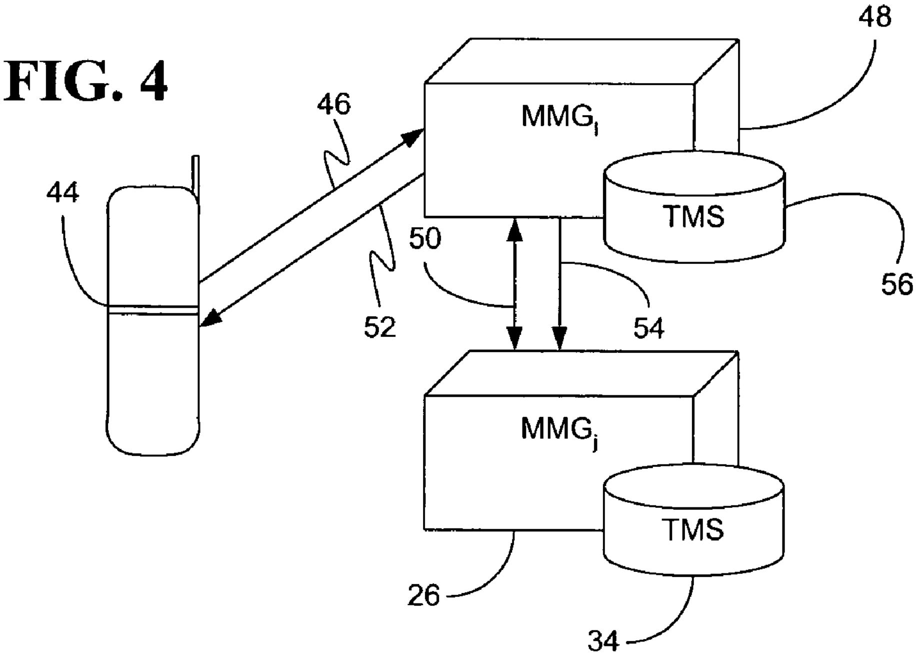
FIG. 4 is a block diagram of an example of a message retrieval process in accordance with one embodiment of the invention.

FIGS. 3 and 4 demonstrate one example of a network topology that can be used to implement the techniques described herein. For example, the method 60 (FIG. 1) of storing information can be implemented in the message arrival diagram of FIG. 3 and the method 10 (FIG. 2) of retrieving messages can be implemented in the message arrival diagram of FIG. 4.

The illustrated network 21 has a plurality of MMG nodes 24, 26, and 48, an MSS node 28 and an SMSC 30. The $MMG_i$ node 24 has a TMS 32, where the $MMG_j$ node 26 has a TMS 34. The MMG, node 48 has a TMS 56. Messages are maintained in a given TMS for a predetermined period such as 14 days from receipt. At any time, each user may be limited to a maximum number of messages such as 500 messages. Messages can be recovered from the TMS in the event of an MMG node failure. With regard to scalability, MMG nodes that are added to the network scale linearly with the number of users serviced. Furthermore, with regard to load-balancing/failover, the removal or addition of an MMG node can be done without interrupting service. Linear scaling is possible because only very limited state information is used internally by each MMG node. For the same reason, load balancing the requests among the multiple MMG nodes is possible. Each MMG node can send a MWI (message-waiting indicator) message to the user's handset to indicate a new message in compliance with the Third Generation Point-to-Point (3GPP) standard, 3GPP-TS100.901. From the user's point of view, there is no difference between using one MMG node or another MMG node.

Assumptions

The average size of a short message in one example is 300 bytes of body and 500 bytes of header, so that the total is 800 bytes. The size of a message digest is 300 bytes of body and 500 bytes of header, so that the total is 800 bytes. Thus, short messages and message digests are assumed to have the same size.

With specific reference to FIG. 3, it can be seen that at arrow 22 a mail or SMS message arrives at an arbitrary MMG node, the $MMG_i$ node 24. Typically, the MMG nodes in the network are hosted by the cellular carrier/service provider. The MMG nodes also are behind a load-balancer switch, and any MMG node may receive a message. In the case of a simple mail transfer protocol (SMTP) message, the $MMG_i$ node 24 determines a subscriber identifier for the message and whether the message can be converted into a short mail. The $MMG_i$ node 24 uses the subscriber identifier and the hash function corresponding to the current topology to determine the actual destination MMG node (e.g., $MMG_j$ node 26). Temporary messages might be one of the following types: converted short mails, SMS messages, or long mail summaries. A long mail summary is used to build the digest and contains the From address, Subject, the first part of the text message, and a reference to the location of a long mail message stored at a particular MSS node. In the case of a long mail, the $MMG_i$ node 24 sends the long mail at arrow 36 to the MSS node 28 for storage to persistent memory or disk 38 and constructs the digest. At arrow 40 the $MMG_i$ node 24 forwards the temporary message to the destination MMG node, $MMG_j$ node 26. It is possible that the $MMG_i$ node 24 is the destination for the temporary message, and therefore no forwarding is necessary. The $MMG_j$ 26 stores the temporary message on TMS 34. Prior to storing the temporary message, a check is done to determine whether the user has exceeded his or her maximum message limit. If the maximum message limit is exceeded, the new message is discarded and a deletion request is sent to the MSS node 28. At arrow 42 the $MMG_j$ node 26 sends a MWI message to a device associated with the subscriber identifier such as wireless handset 44 via an SMSC 30. The MWI message does not need to contain an IP address, URI, or any other type of data.

Turning now to FIG. 4, it can be seen that at arrow 46 the handset 44 sends a message retrieval request to an arbitrary MMG, node 48. As already noted, the MMG nodes are behind a load-balancer switch. Accordingly, any MMG node may receive a message retrieval request. The MMG, node 48 uses the destination hash functions to determine the destination MMG nodes as discussed above. At arrow 50 $MMG_i$ node 48 retrieves the message from destination nodes such as $MMG_j$ node 26. It is possible that the MMG, node 48 is the destination for the message, and therefore no forwarding is necessary. At arrow 52 the MMG, node 48 builds and sends to the handset 44 a short message or a formatted mail digest based on the user's temporary messages. After the handset retrieval transaction has been confirmed to be complete, the MMG, node 43 sends a "message-sent" confirmation message to the $MMG_j$ node at arrow 54. Upon receiving confirmation, the $MMG_j$ node 26 deletes the message. It should be noted that confirmation and deletion as described may not be necessary if retrieved messages are retained until they expire. There is also a possibility that short messages will involve both a retrieval of the message digest and the message body.

Figure 5:
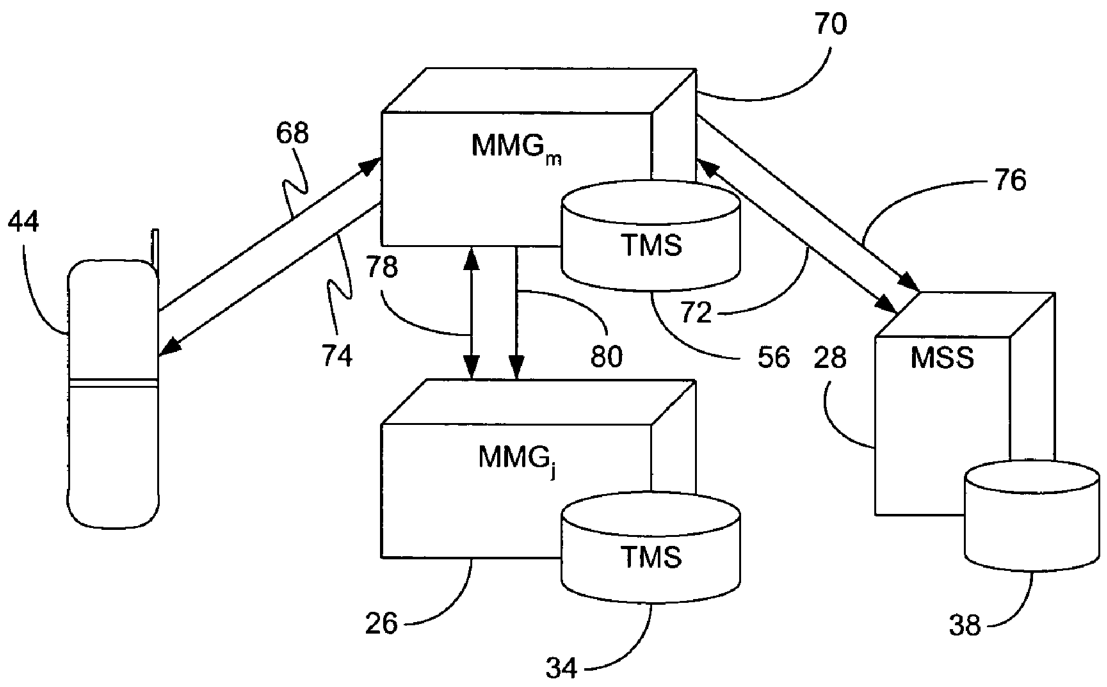
FIG. 5 is a block diagram of an example of a message retrieval process in accordance with an alternative embodiment of the invention.

FIG. 5 shows a scenario in which a long mail message is retrieved from the MSS node 28. It should be noted that the network can also include other MSS nodes. At arrow 68 the handset 44 sends a message retrieval request to an arbitrary $MMG_m$ node 70. As already discussed, any MMG node may receive a message retrieval request. The $MMG_m$ node 70 uses the destination hash functions to determine the destination MMG nodes. At arrow 78 $MMG_m$ node retrieves the message from destination nodes such as $MMG_j$ node 26. The retrieved message includes a reference to the location of the long mail messages stored at the MSS node 28. At arrow 72 $MMG_m$ node 70 retrieves one or more long mail messages from the MSS node 28. At arrow 74 the $MMG_m$ node 70 builds and sends the long mail messages to the handset 44. After the handset retrieval transaction has been confirmed to be complete, the $MMG_m$ node 70 sends a "message-sent" confirmation message to the $MMG_j$ node 26 at arrow 80 and sends a "mail-delete" request message to the MSS node 28 at arrow 76. On receiving confirmation, the $MMG_j$ node 26 and the MSS node 28 delete the retrieved messages. Confirmation and deletion may not be necessary if retrieved messages are retained until they expire.

Destination Hash Function

Messages are approximately evenly distributed among nodes and the hash function minimizes the need to redistribute messages if a node is added or removed. The hash function is also computable by each MMG node independently and is quick to compute. As already discussed, assuming n MMG nodes numbered from 0 to n−1, a simple hash function H( ) is to use the user's MSISDN modulo the number of MMG nodes: H(MSISDN)=MSISDN % n. Such hash functions are well known to persons skilled in the art, and the present invention is not intended to be limited to any particular hash function.

The MMG node for a particular user then has the index H(MSISDN). The MMG nodes can be identified by IP address using a configuration table that maps an index [0, n−1] to the node IP address. Each geographical region can have an independent set of MMG nodes that are selected among by the hash function.

When the number of MMG nodes changes by adding or removing MMG nodes, the hash function may no longer work correctly since it will not be able to store messages to an added node, or it will not be able to retrieve messages from a removed node. To address this problem, a plurality of hash functions is used, where each hash function corresponds to a topology of the network at a particular moment in time. A hash function is considered active if it corresponds to an MMG node network topology no older than the message validity period (such as 30 days). All active hash functions are maintained. Active hash functions eventually become older than the message validity period and are then deleted. For storing messages, the hash function corresponding to the current network topology is used. For retrieving messages, however, all active hash functions are used to compute the destination MMG node, and all destination nodes are queried to retrieve the user's temporary messages. The above approach and method of calculating destination MMG nodes can also be applied, if necessary, to calculating destination MSS nodes for long message storage and retrieval.

Message Store, Caching and Maintenance Thread

The indexing and storage system of the MMG message queue is used for the TMS. The number of messages per user is maintained to check the maximum per-user message limit. An indexing method is used to access all the user's temporary messages on a node. Each MMG node maintains a cache of the temporary messages that are stored locally. Shared memory protected by a mutual-exclusion lock prevents conflicts by the multiple MMG processes running simultaneously on the same node. Each MMG process runs a maintenance thread that executes periodic tasks such as deleting expired temporary messages and removing obsolete hash functions.

Communication Failure

To protect against temporary communication failure between MMG nodes, the source MMG queues the messages. When the queue is full, new temporary messages are rejected. When a new MMG node is added to the set of MMG nodes, a new destination hash function is created and added to the active list for all MMG nodes.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of managing a network, comprising:

receiving a message at an initial storage node, the message including a subscriber identifier;

calculating an actual destination node based on the subscriber identifier and a first addressing function corresponding to a current topology of the network;

sending the message to the actual destination node for storage;

storing the message to an internal queue of the initial storage node;

removing the message from the internal queue if a confirmation of receipt is received from the actual destination node;

sending a message waiting indicator message toward a device associated with the subscriber identifier;

receiving a message retrieval request at an initial retrieval node of the network, the message retrieval request including the subscriber identifier;

calculating a plurality of destination nodes based on the subscriber identifier and a plurality of addressing functions, each addressing function corresponding to a topology of the network at a particular moment in time, the plurality of destination nodes including the actual destination node and the plurality of addressing functions including the first addressing function;

querying the calculated plurality of destination nodes for the message;

receiving the message from the actual destination node; and forwarding the message toward an originator of the message retrieval request, wherein the addressing functions are hash functions.

2. The method of claim 1, wherein the originator of the message retrieval request is a wireless handset, the message being at least one of a short messaging service message and a mail digest.

3. The method of claim 1, wherein the originator of the message retrieval request is a wireless handset, the message being a long messaging service message.

4. The method of claim 1, further including:

receiving a plurality of messages from the calculated plurality of destination nodes; and forwarding the plurality of messages toward the originator of the message retrieval request.

5. The method of claim 1, further including expiring one or more of the plurality of addressing functions based on a message validity period.

6. The method of claim 1, further including expiring one or more of the plurality of addressing functions for an expired destination node based on a local expiration signal from the expired destination node.

7. The method of claim 1, further including:

applying a time stamp to each of the plurality of addressing functions; and delivering each of the plurality of addressing functions to the plurality of destination nodes before activation.

8. A method of managing a network, comprising:

receiving a message at an initial storage node, the message including a subscriber identifier;

calculating an actual destination node based on the subscriber identifier and a first addressing function corresponding to a current topology of the network;

sending the message to the actual destination node for storage;

storing the message to an internal queue of the initial storage node;

removing the message from the internal queue if a confirmation of receipt is received from the actual destination node;

sending a message waiting indicator message toward a device associated with the subscriber identifier;

receiving, by a first node that stores messages, a message retrieval request;

calculating, by the first node using a subscriber identifier and a first addressing function, a second node that stores messages;

calculating, by the first node using the subscriber identifier and a second addressing function, a third node that stores messages; and forwarding, by the first node, the message retrieval request to the second and third nodes, wherein the first and second addressing functions are hash functions.

9. The method of claim 8, wherein the first and second addressing functions correspond to a topology of the network at different moments in time.

10. The method of claim 8, wherein the first and second addressing functions are hash functions, and the first and second addressing functions each have a different expiration time.

11. A non-transitory computer readable medium to store a set of instructions capable of being executed by a processor to:

receive a message at an initial storage node, the message including a subscriber identifier;

calculate an actual destination node based on the subscriber identifier and a first addressing function corresponding to a current topology of the network;

send the message to the actual destination node for storage;

store the message to an internal queue of the initial storage node;

remove the message from the internal queue if a confirmation of receipt is received from the actual destination node;

send a message waiting indicator message toward a device associated with the subscriber identifier;

receive a message retrieval request at an initial retrieval node of the network, the message retrieval request including the subscriber identifier;

calculate a plurality of destination nodes based on the subscriber identifier and a plurality of addressing functions, each addressing function corresponding to a topology of the network at a particular moment in time, the plurality of destination nodes including the actual destination node and the plurality of addressing functions including the first addressing function;

query the calculated plurality of destination nodes for the message;

receive the message from the actual destination node; and forward the message toward an originator of the message retrieval request, wherein the addressing functions are hash functions.

12. The medium of claim 11, wherein the originator of the message retrieval request is a wireless handset, the message being at least one of a short messaging service message and a mail digest.

13. The method of claim 11, wherein the originator of the message retrieval request is a wireless handset, the message being a long messaging service message.

14. The medium of claim 11, wherein the instructions are further capable of being executed to:

receive a plurality of messages from the calculated plurality of destination nodes; and forward the plurality of messages toward the originator of the message retrieval request.

15. The medium of claim 11, wherein the instructions are further capable of being executed to:

expire one or more of the plurality of addressing functions based on a message validity period.

16. The medium of claim 11, wherein the instructions are further capable of being executed to:

expire one or more of the plurality of addressing functions for an expired destination node based on a local expiration signal from the expired destination node.

17. The medium of claim 11, wherein the instructions are further capable of being executed to:

apply a time stamp to each of the plurality of addressing functions; and deliver each of the plurality of addressing functions to the plurality of destination nodes before activation.

* * * * *